April 27, 1926. 1,582,447
R. M. BRANDON ET AL
BRAKE
Filed Jan. 29, 1923
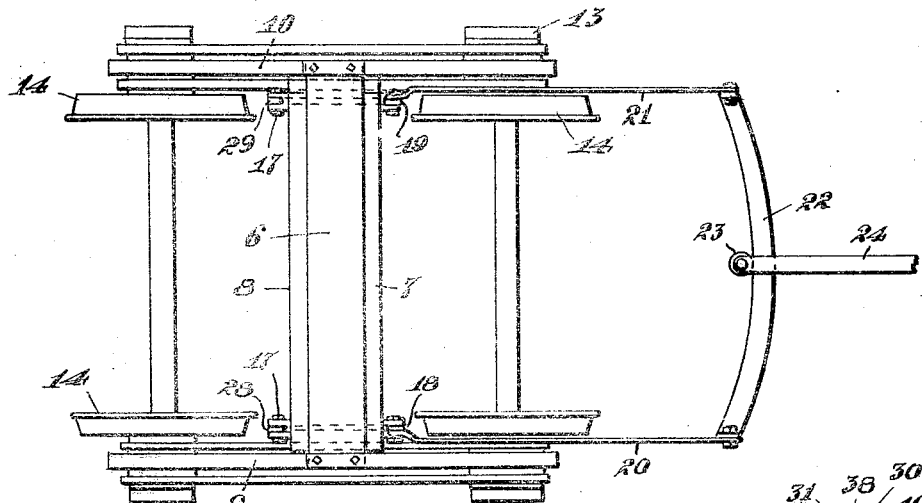
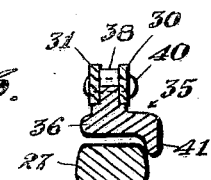
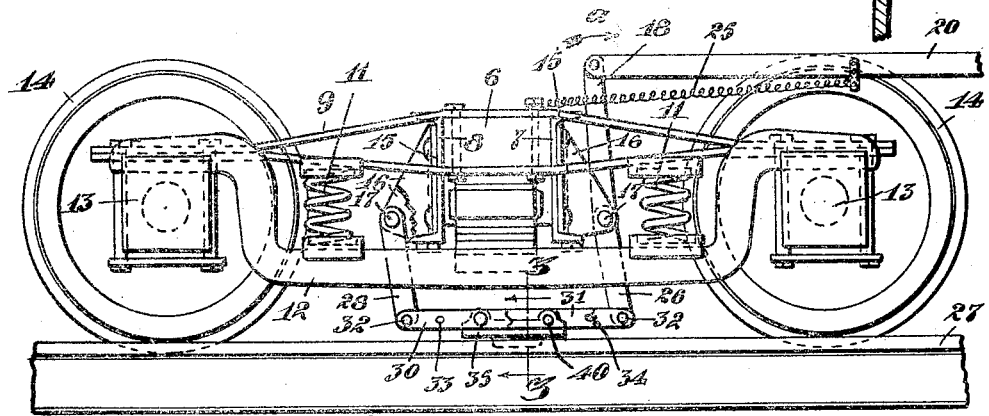
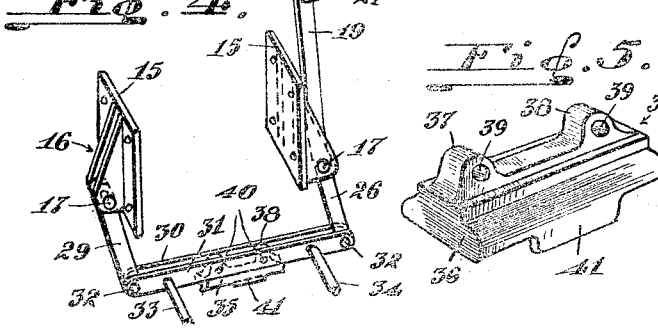
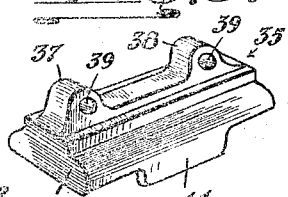
INVENTORS;
RALPH M. BRANDON, AND
ARTHUR V. CANFIELD
BY
ATTORNEY.

Patented Apr. 27, 1926.

1,582,447

UNITED STATES PATENT OFFICE.

RALPH M. BRANDON AND ARTHUR V. CANFIELD, OF PASADENA, CALIFORNIA.

BRAKE.

Application filed January 29, 1923. Serial No. 615,532.

*To all whom it may concern:*

Be it known that we, RALPH M. BRANDON and ARTHUR V. CANFIELD, citizens of the United States, residing at Pasadena, in the county of Los Angeles and State of California, have invented new and useful Improvements in Brakes, of which the following is a specification.

This invention pertains to a brake which is especially adapted for use on street cars and the like and particularly pertains to a brake for effecting frictional engagement directly between a car truck and the railway rails.

An object of the invention is to provide a rail-engaging brake embodying a brake shoe which, when disposed in slidable or frictional engagement with a rail, will readily traverse switches, frogs and the like without interference.

Another object is to provide a means whereby the brake shoe may be moved in and out of contact with the rail in parallel relation thereto, and can be advanced and retracted relative to the rail on an arcuate path of travel.

Another object is to provide a brake of the above character which is adapted to be applied to car trucks of the type now generally in use, and is also adapted to be operated by the ordinary brake-actuating mechanism.

With the foregoing objects in view, together with such other objects and advantages as may subsequently appear, the invention resides in the parts, and in the combination, arrangement and construction of parts hereinafter described and claimed and illustrated in the accompanying drawings, in which—

Figure 1 is a plan view of an ordinary double truck with parts removed, and illustrating the manner of applying the invention thereto.

Figure 2 is a view of a truck as seen in side elevation with the invention as applied.

Figure 3 is a detail in section of the brake shoe and rail, as seen on the line 3—3 of Figure 2.

Figure 4 is a detail in perspective of the brake shoe mounting.

Figure 5 is a perspective view of the brake shoe.

More specifically, 6 indicates a truck bolster carrying transoms 7 and 8 in the form of channel irons, which transoms extend longitudinally on opposite sides of the bolster, and 9 and 10 indicate side members of the truck frame carried by the bolster and extending at right angles thereto, which are supported on springs 11 seating on equalizer bars 12 carried by the journal boxes 13 which receive the axles of the wheels 14. The truck members just described are those commonly embodied in truck construction and constitute no part of the present invention.

In carrying out the invention, a bearing plate 15 is mounted adjacent each end of the transoms 7 and 8; each bearing plate embodying a pair of spaced flanges 16 constituting yokes which carry horizontally, arranged pivot pins 17. Pivotally connected by the pins 17 to the bearing plates 15 carried by the transom 7, are vertically extending live levers 18 and 19, the upper ends of which project above the bolster and are connected to horizontally extending pull rods 20 and 21, the outer ends of which connect with a quadrant 22 engaged by a roller 23 on a brake rod 24 leading to any suitable brake-operating mechanism, not shown.

A suitably arranged spring 25 is connected at one end relative to the truck frame and at the other to the pull rod in such manner as to usually oppose movement of the pull rod in one direction and to effect movement of the pull rod in the opposite direction on release of pull thereon, as is common in brake rigging of this character.

The lower portion 26 of the live levers 18 and 19 depends to a point immediately above and in spaced relation to the rail 27 on which the wheels 14 are carried. Depending from the pivot pins 17 on the plates 15 carried by the transom 8, are links or dead levers 28 and 29 the lower ends of which dead levers terminate immediately above the top face of the rail 27 in spaced relation thereto. Extending between the lower portions 26 of the live levers 18 and 19 and the lower ends of the dead levers 28 and 29 is a pair of links 31 and 30 which links are spaced apart and extend on opposite sides of the levers and are pivotally connected to the latter by pivot pins 32. A pair of tie rods 33 and 34 connect the links 30—31 carried by the levers 18 and 28 with the links 30—31 carried by the levers 19 and 29 so as to maintain the pairs of links in proper spaced relation with each other. The links 30 and 31 are arranged to extend directly above the upper face of the rail 27 in spaced relation thereto.

Carried by each pair of links 30—31 is a brake shoe 35 particularly illustrated in Figures 3 and 5, which brake shoe embodies a body portion 36 adapted to extend longitudinally of the rail 27 and having a flat under face extending parallel with the top face of the rail and adapted to frictionally engage the latter on being moved into contact therewith. Projecting upwardly from the body member 36 is a pair of lugs 37 and 38 formed with transverse openings 39, which lugs are designed to be positioned between the links 30 and 31 and to be engaged with the links by means of bolts 40 which are passed through the links and through the openings 39 in the lugs.

Formed on the inner edge of the brake shoe body member 36 is a downwardly extending flange 41 which projects along the inner side of the rail 27, as particularly shown in Figure 3, which flange serves in cooperation with the rail, to hold the brake shoe against swinging outwardly relative to the rail. The brake shoes being connected together by tie rods 33 and 34 are held against inward movement relative to the rail by the flange 41. The flange 41 is of a comparatively short length so that it may readily pass between switches and frogs and traverse curves without interference.

The brake shoes are normally held out of contact with the top faces of the rails by means of the springs 25, which, in exerting a pull on the pull rods 20 and 21, serves to hold the live levers 18 and 19 in a retracted position, in which position the shoes will be maintained clear of the rails.

In the operation of the invention, to apply the brakes the brake rigging is operated in the usual manner so as to effect a pull on the pull rods 20 and 21 in opposition to the springs 25, thereby advancing the upper ends of the live levers 18 and 19 in the direction indicated by the arrow A in Figure 2. This movement of the levers 18 and 19 causes the lower portions 26 thereof to move downwardly as the lower ends of the portions 26 are normally disposed to one side of the plane of the vertical center of the pivot pins 17 on which the levers are fulcrumed. This downward movement of the lower end portions of the levers causes the links 30—31, and the brake shoes carried thereby, to advance toward the rails 27 until further movement is arrested by the brake shoes coming into contact with the rails. On applying power to the pull rods and levers, the brake shoes may be caused to bear on the rails with such pressure so as to effect such frictional engagement therewith as to retard movement of the trucks on the rails.

We claim—

In a rail brake construction, a truck bolster, a pair of levers pivotally carried by said bolster and having depending lower end portions, a pair of links connecting the lower ends of said levers and a brake shoe formed with upstanding lugs fixedly engaged between said links, said shoe being arranged to extend longitudinally of a rail in close proximity thereto, said levers and links being operable to move said shoe in an arcuate path of travel in and out of engagement with a rail and with the shoe maintained at all times in parallel relation to the rail.

RALPH M. BRANDON.
ARTHUR V. CANFIELD.